Jan. 28, 1947.  E. E. LONGFELLOW  2,414,882
FRACTURE REDUCTION APPARATUS
Filed Sept. 24, 1943
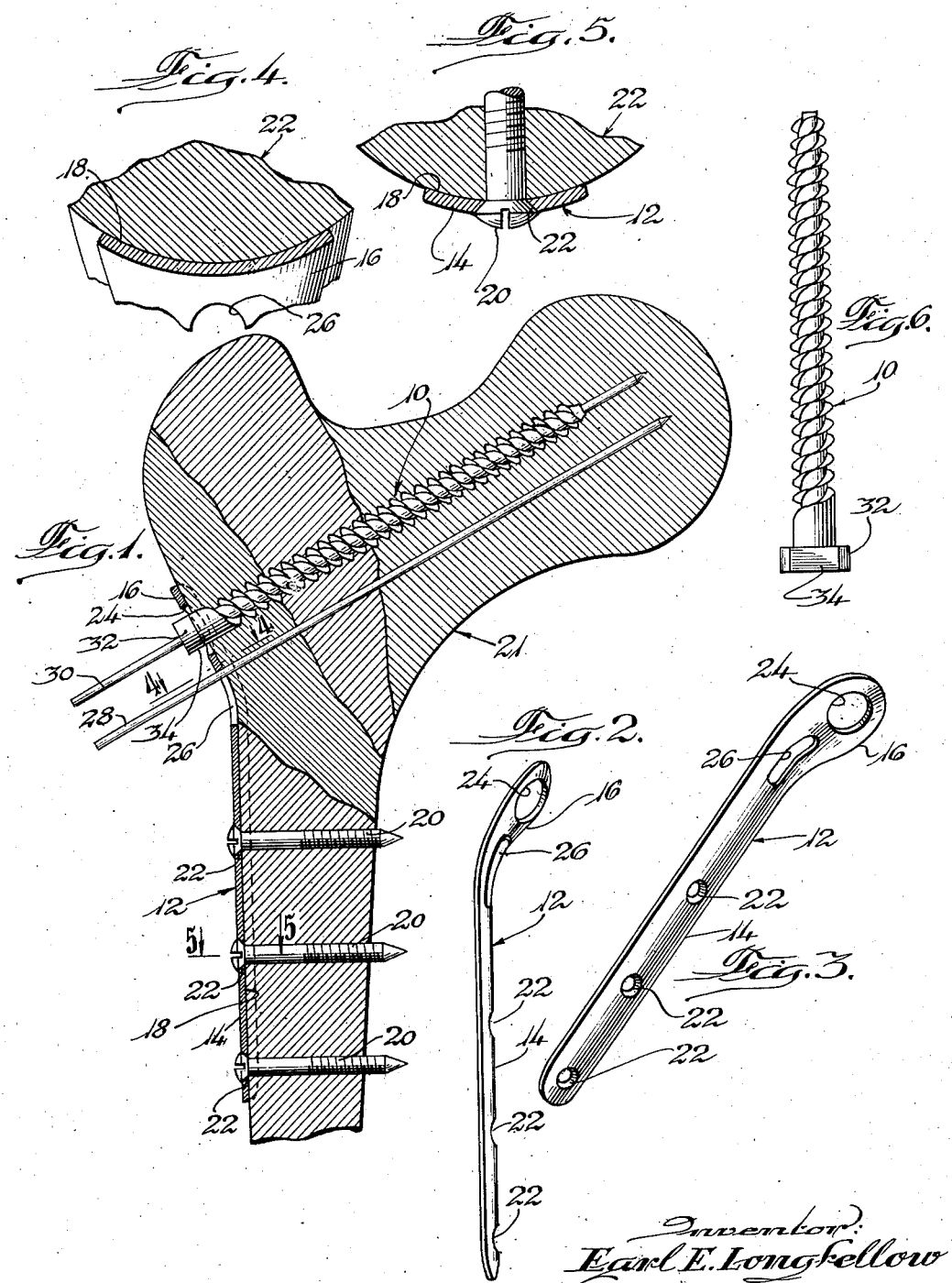
Inventor:
Earl E. Longfellow
By Williams, Bradbury & Hinkle
Attorneys.

Patented Jan. 28, 1947

2,414,882

UNITED STATES PATENT OFFICE 2,414,882

FRACTURE REDUCTION APPARATUS

Earl E. Longfellow, Warsaw, Ind., assignor to H. Herschel Leiter, Warsaw, Ind.

Application September 24, 1943, Serial No. 503,634

1 Claim. (Cl. 128—92)

The present invention relates to fracture reduction apparatus and to an intertrochanteric bone plate comprising a part of said apparatus.

One of the objects of the present invention is to provide a new and improved intertrochanteric bone plate.

Another object of the present invention is to provide a new and improved intertrochanteric bone plate adapted especially for use in the immobilization of hip fractures in conjunction with lag screws, such as cannulated lag screws.

A further object of the invention is to provide a new and improved intertrochanteric bone plate so constructed and arranged that it may be readily located relative to the bone even though guide wires (which are preferably used to stabilize the fracture) inserted into the bone are not located relative to each other in certain definite position. In other words, the guide wires need not be exactly positioned.

Another object of the present invention is the provision of a new and improved intertrochanteric bone plate especially adapted for use with lag screws and wires introduced to stabilize the fracture, and one of which acts as a guide for the screw.

Another object of the present invention is to provide an intertrochanteric bone plate having a resilient end section through which extends a bone piercing element whereby the element is locked in place.

A still further object of the present invention is to provide a new and improved hip fracture reduction apparatus including an intertrochanteric bone plate and a lag screw.

Other objects and advantages of the present invention will become apparent from the following description, in the course of which reference is had to the accompanying drawing in which Fig. 1 is a cross-sectional view of a hip fracture immobilized by the fracture reduction apparatus of the present invention;

Figs. 2 and 3 are perspective views of the bone plate, the views being taken at different angles better to illustrate the shape of the plate;

Fig. 4 is a fragmentary cross-sectional view taken along the line 4—4 of Fig. 1;

Fig. 5 is a fragmentary cross-sectional view taken along the line 5—5 of Fig. 1; and Fig. 6 is an elevational view of the Lorenzo lag screw.

The fracture reduction apparatus of the present invention is adapted especially for the immobilization of hip fractures. It includes, in the main, a lag screw 10, such as a known type of cannulated lag screw, and an intertrochanteric bone plate 12 of novel construction.

The intertrochanteric bone plate 12 may be fabricated simply and economically as from a flat piece of metal, such as stainless steel. It includes a relatively long lower portion 14 of substantially uniform width and a shorter, tapering upper portion 16 disposed at an angle to the lower portion so that the plate may be brought into contact with a bone throughout its length. The plate is made to better fit the contour of the bone by curving it so that its inner surface 18 is generally concave, as may be best noted from Figs. 4 and 5. The ends of the plate are rounded to avoid sharp corners that might injure the bone or surrounding tissue.

The bone plate is secured to the bone by a plurality of screws 20 passing through the distal fragment of the femur and by the screw 10 passing through the great trochanter, the neck and the head of the femur, which is indicated by reference character 21. The screws 20 pass through countersunk apertures 22 in the bone plate 12 adapted closely to receive the heads of the screws. The screws 20 preferably pass entirely through the bone, while the lag screw 10 is of length such that terminates some distance short of the exterior of the head of the femur.

In accordance with one of the features of the present invention, the bone plate is provided with an enlarged aperture 24 through which the screw 10 passes. By making the aperture larger the lag screw need not be positioned with as great a degree of accuracy relative to the bone plate.

Another feature of the present invention resides in providing the bone plate with a relatively narrow and long slot 26 adapted to cooperate with a wire 28 passing through two or more bone fragments into the head of the femur and acting to stabilize the fracture with a second wire 30 utilized also as a guide for the screw 10, which is of the cannulated type. The slot 26 is of a width somewhat greater than the diameter of the wire and is of considerable length so that the plate may be secured to the bone with the wires in place even though the wires may not be disposed relative to each other with great accuracy.

It is preferred that all of the openings in the plate be made before it is bent in order to facilitate the making of the openings, as well as to facilitate the bending.

A further feature of the present invention resides in making the apparatus substantially self locking, thereby to prevent the screw from becoming loose or backing out. This is accomplished by bending the portion 16 relative to portion 14 a slight extent more than required by the contour of the bones with which it is to be used so that, when the plate is drawn against the bone, the resiliency of the metal exerts an outward pull on the screw 10 through contact with the screw head 32. The security of screw 10 is enhanced by tightening the screw until its head 32, which is provided with flat sides 34, is located transversely of the plate. When this is done the screw head is held within a depression resulting from the transverse bending of the plate and making the aperture 24 somewhat larger than the diameter of the screw.

In the treatment of fractures, with the apparatus of the present invention, the reduction of the fracture is first effected with the assistance of fluoroscopic or X-ray equipment. When the reduction has been effected the bone fragments are in approximately the positions in which they are shown in Fig. 1.

The first step in the immobilization of a fracture (after an incision has been made, in order to enable the bone plate to be placed next to the bone) is to stabilize the bone fragments preparatory to insertion of the lag screw. This is accomplished through the use of the two guide wires 28 and 30, which are inserted into the neck of the femur at the proper angle, i. e., in line with the axis of the neck and preferably displaced somewhat off-center relative to the neck in order that the screw may be inserted into the neck using the wire 30 as a guide. The use of two wires stabilizes the fracture as the wires prevent relative movement of the bone fragments during the insertion of the screw. The guide wires may be inserted into the bone in conventional manner and to a depth somewhat greater than the length of the screw that is to be used. The guide wires, however, should not pierce the head of the femur.

After the bone fragments have been stabilized a cannulated reamer is placed over the guide wire 30 and the bone is reamed through the cortex or for a length of about four complete screw threads. It is preferred, as indicated, that the screw be inserted at the position determined by the upper guide wire 30, but this is not necessary as a surgeon may deem it preferable to insert the screw using the lower wire 28 as a guide. After the bone has been reamed the reamer is removed.

The intertrochanteric bone plate is now placed next to the bone with the guide wires 28 and 30 passing through the slot 26 and aperture 24, respectively. Because of the size of aperture 24, and the length of slot 26, the bone plate may be readily positioned, and the guide wires will prevent the bone plate from moving undesirably during the succeeding steps of the treatment. In other words, the guide wires anchor the plate.

The cannulated lag screw 10 is inserted over guide wire 30 and driven into the bone fragments with the conventional socket wrench until the head 32 almost begins to draw the portion 16 of the bone plate toward the bone.

A number of holes are next drilled in the lower fragment of the bone 21 to receive the screws 20. These holes are drilled with the lower portion 14 of the bone plate against the bone. The hole should have a diameter slightly less than the diameter of the screws (which may be of known type), thereby to ensure a more perfect fit, and yet not result in splitting the bone. The screws are then positioned but they are not screwed all the way in, i. e., the lower portion of the bone plate is drawn fairly close, but not tightly, against the bone.

The lag screw is then inserted further into the bone to draw the portion 16 tightly against the bone, and preferably to an extent such that the head 32 is disposed with its flat side 34 transversely of the opening 24, thereby to increase the security with which the screw is held in place.

The screws 20 are then screwed all the way in to bring the power portion 14 of the bone plate 12 against the bone. When the bone plate is thus screwed the resiliency between the two sections exerts a pull on the lag screw thereby to assist in locking the screw in place so that it will not become loose or back out.

During the major portion of the aforesaid treatment the guide wires 28 and 30 assist in anchoring the plate so that it will not move or wobble around during the insertion of the various screws. After the fractured bone has been immobilized the guide wires 28 and 30 or one of them, may be left in the bone; or both may be withdrawn.

From the foregoing description it may be noted that the apparatus of the present invention may be made simply and economically and also readily used without requiring unduly accurate positioning of the various guide wires, or screw, or bone plate.

While a single embodiment of the invention has been illustrated in detail it should be understood that such details are for the purpose of illustration and not for the purpose of limitation.

What I claim as new, and desire to secure by Letters Patent, is as follows:

An intertrochanteric bone plate adapted to be secured to the femur comprising a first and relatively long portion, and a second and shorter portion disposed at an angle relative to the first, said first portion being apertured for the passage of securing means therethrough, said second portion being apertured for the passage of other securing means therethrough, and adjoining portions of both being provided with a continuous slot, said plate having a concave bone contacting surface and being made of material that is somewhat resilient, and said angular disposition being such that when the plate is secured to the femur the second portion exerts an outward pull on the securing means passing therethrough.

EARL E. LONGFELLOW.